(12) United States Patent
Wartmann

(10) Patent No.: US 9,333,553 B2
(45) Date of Patent: May 10, 2016

(54) NET, IN PARTICULAR FOR PROTECTION, SAFETY, WATER-REARING OR ARCHITECTURAL PURPOSES, AND AN APPARATUS FOR PRODUCING THE NET

(71) Applicant: Geobrugg AG, Romanshorn (CH)

(72) Inventor: Stephan Wartmann, Uttwill (CH)

(73) Assignee: Geobrugg AG, Romanshorn (CH)

( * ) Notice: Subject to any disclaimer, the term of this patent is extended or adjusted under 35 U.S.C. 154(b) by 0 days.

(21) Appl. No.: 14/380,303

(22) PCT Filed: Feb. 22, 2013

(86) PCT No.: PCT/EP2013/000518
§ 371 (c)(1),
(2) Date: Aug. 21, 2014

(87) PCT Pub. No.: WO2013/124070
PCT Pub. Date: Aug. 29, 2013

(65) Prior Publication Data
US 2015/0041599 A1    Feb. 12, 2015

(30) Foreign Application Priority Data

Feb. 24, 2012    (CH) .......................................... 248/12

(51) Int. Cl.
*B21F 27/02*    (2006.01)
*B21F 27/00*    (2006.01)
(Continued)

(52) U.S. Cl.
CPC .............. *B21F 27/005* (2013.01); *A01K 61/007* (2013.01); *A01K 75/00* (2013.01); *B21F 27/02* (2013.01); *B21F 27/04* (2013.01); *E01F 7/04* (2013.01); *E02B 3/124* (2013.01)

(58) Field of Classification Search
CPC ........ B21F 27/02; B21F 27/005; B21F 31/00; B21F 15/04; E01F 7/04; E01F 13/028; E01F 7/045; E04G 21/3261; E04G 21/28; E02B 3/124; E02D 17/20; E02D 29/0208
USPC ......... 245/5, 8, 2, 7, 1, 11, 3, 9, 6; 405/302.7, 405/27, 63, 72; 140/7, 102, 111, 92.3
See application file for complete search history.

(56) References Cited

U.S. PATENT DOCUMENTS

| | | | |
|---|---|---|---|
| 4,530,205 A | 7/1985 | Seiler et al. | |
| 4,982,813 A | * 1/1991 | Starr | .............................. 182/138 |

(Continued)

FOREIGN PATENT DOCUMENTS

| | | |
|---|---|---|
| DE | 2327005 A1 | 12/1974 |
| GB | 1475190 A | 6/1977 |

OTHER PUBLICATIONS

Braid. (n.d.) American Heritage® Dictionary of the English Language, Fifth Edition. (2011). Retrieved Jul. 29, 2015 from http://www.thefreedictionary.com/braid.*

*Primary Examiner* — Bobby Muromoto, Jr.
(74) *Attorney, Agent, or Firm* — Brian Roffe

(57) ABSTRACT

A net, in particular for protection, safety, water-rearing or architectural purposes, is braided together from individual helically curved longitudinal elements (3) to form a braided structure. Individual longitudinal elements (3) curved into a cylinder or screw shape are twisted one inside the other with adjacent ones and compressed such that the braided structure is in more or less planar sheet-like form and the longitudinal elements (3) here each form more or less rectilinear limbs (8a, 8b; 9a, 9b) and curves (10a, 10b; 11a, 11b) therebetween. The curves (10a, 10b; 11a, 1b) between elongate limbs (8a, 8b; 9a, 9b) are inflected in kink form. This gives a net design with unexpectedly high strength values.

20 Claims, 3 Drawing Sheets

(51) Int. Cl.
  *E02B 3/12* (2006.01)
  *A01K 61/00* (2006.01)
  *B21F 27/04* (2006.01)
  *E01F 7/04* (2006.01)
  *A01K 75/00* (2006.01)

(56) References Cited

U.S. PATENT DOCUMENTS

| | | | |
|---|---|---|---|
| 4,986,389 A * | 1/1991 | Halligan et al. | 182/138 |
| 5,582,266 A * | 12/1996 | Rexroad et al. | 182/138 |
| 5,597,017 A | 1/1997 | Eicher et al. | |
| 5,669,214 A | 9/1997 | Kopanakis | |
| 5,996,972 A * | 12/1999 | Kaiser | 256/12.5 |
| 6,279,858 B1 | 8/2001 | Eicher | |
| 6,592,103 B2 | 7/2003 | Sennhauser | |
| 7,108,233 B2 * | 9/2006 | Giuseppin | 245/5 |
| 7,188,825 B2 | 3/2007 | Sennhauser | |
| 7,325,774 B2 * | 2/2008 | Jun et al. | 245/2 |
| 7,975,594 B2 * | 7/2011 | Wartmann | 89/36.02 |
| 8,070,107 B2 * | 12/2011 | Chen et al. | 245/7 |
| 8,678,709 B2 * | 3/2014 | Utz et al. | 405/72 |
| 2006/0144640 A1 * | 7/2006 | Wartmann | 182/138 |
| 2007/0131917 A1 * | 6/2007 | Wartmann | 256/12.5 |
| 2007/0210214 A1 * | 9/2007 | Wartmann | 245/5 |
| 2008/0164379 A1 * | 7/2008 | Wartmann et al. | 245/8 |
| 2009/0022549 A1 * | 1/2009 | Wartmann | 405/60 |
| 2010/0224736 A1 * | 9/2010 | Chen et al. | 245/7 |
| 2010/0294201 A1 * | 11/2010 | Amils et al. | 119/201 |
| 2011/0154739 A1 * | 6/2011 | Grun | 49/50 |
| 2011/0265729 A1 * | 11/2011 | Atz et al. | 119/226 |
| 2012/0121342 A1 * | 5/2012 | Utz et al. | 405/302.7 |
| 2012/0241565 A1 * | 9/2012 | Wartmann | 245/5 |
| 2013/0251461 A1 * | 9/2013 | Fulde | 405/302.7 |
| 2013/0299040 A1 * | 11/2013 | Atz et al. | 140/3 R |
| 2015/0041599 A1 * | 2/2015 | Wartmann | 245/8 |

* cited by examiner

NET, IN PARTICULAR FOR PROTECTION, SAFETY, WATER-REARING OR ARCHITECTURAL PURPOSES, AND AN APPARATUS FOR PRODUCING THE NET

FIELD OF THE INVENTION

The invention relates to a net, in particular for protection, safety, water-rearing or architectural purposes which is twisted together from individual helically or similarly bent longitudinal elements, such as wires, to form a woven structure, individual longitudinal elements curved into a cylinder or screw shape or similar being twisted one inside the other with adjacent ones and being compressed such that the braided structure forms a substantially planar sheet-like form and the longitudinal elements each form substantially rectilinear limbs and curves in between, and an apparatus for producing the net.

BACKGROUND OF THE INVENTION

Protective nets of this type are characterised in that they have a high tear strength and good deformability, and on this basis can be stressed to a considerable extent. This type of protective net is disclosed in WO 2010/049089 which relates to a high-strength braided structure composed of wire spirals twisted one inside the other and which are pressed flat to form three-dimensional rows of loops. This procedure enables inexpensive production of the braided structure.

OBJECTS AND SUMMARY OF THE INVENTION

The object underlying the invention is to improve the strength values of the net with simple structural measures while retaining these advantages, and moreover to enable faultless production of such nets or braided structures.

The object is achieved according to the invention by a net including a plurality of individual, bent longitudinal elements coupled together to form a woven structure. Each longitudinal elements is individually curved into a cylinder or screw shape to provide a first set of spaced apart curves on a first side of the longitudinal element and a second set of spaced apart curves on a second side of the longitudinal element, the curves in the first and second sets of curves alternating with one another in a longitudinal direction of the longitudinal element such that each curve of the first set is between two curves of the second set and each curve of the second set is between two curves of the first set. A first one of the longitudinal elements is twisted on one side with an adjacent second one of the longitudinal elements such that each curve of the first set of curves of the first longitudinal element passes around and inside of a respective curve of the second set of curves of the second longitudinal element to form knots each between one of the curves of the first set of curves of the first longitudinal element and a respective curve of the second set of curves of the second longitudinal element. The first longitudinal element is twisted on another side with an adjacent third one of the longitudinal elements such that each curve of the second set of curves of the first longitudinal element passes around and inside of a respective curve of the first set of curves of the third longitudinal element to form knots each between one of the curves of the second set of curves of the first longitudinal element and the respective curve of the first set of curves of the third longitudinal element. The longitudinal elements are compressed such that the woven structure has a substantially planar form. Each longitudinal element include elongate limbs between adjacent curves such that each limb is situated between one of the curves of the first set of curves and one of the curves of the second set of curves. The curves between the elongate limbs are kinks. The object is also achieved by an apparatus including stamps arranged in rows and which are adjustable in relation to one another transversely to the longitudinal extension of the longitudinal elements, each stamp including a guide groove for centering the longitudinal element on a front face side, and which run according to a gradient angle of the limbs. The stamps have an initial position in which one of the bent longitudinal elements is turned or inserted in the guide grooves of the stamps, and a final position in which the longitudinal element is compressed. The respective kinked shape of the curves is produced by the elongate limbs being guided through the stamps over substantially their entire length and the longitudinal elements respectively only projecting out of the stamps at the curve.

Advantageously, these curves respectively made in the form of kinks between the elongate limbs are produced such that the respectively adjacent limbs are compressed against one another transversely to their longitudinal extension until the planar sheet-like form plus an additional angle is achieved.

In the apparatus according to the invention the elongate limbs that are produced upon achieving the planar sheet-like form are guided over almost their entire length through stamps and the longitudinal elements respectively only project from the stamps at the curve.

The kinks in the limb regions according to the invention increase the flexibility of the net and to some extent loosen the geometry of the net, and in nature this leads to a visually advantageous camouflaging effect. Since these nets according to the invention are used above all in nature to counter natural hazards, this is an advantage with respect to conventional nets.

The kinks in the nets lead, moreover, to a loose, three-dimensional structure which for architectural applications achieves novel visual effects which can be used, for example, for large-scale façade coverings.

For the purpose of a mostly mirror-symmetrical design of the braided structure the invention makes provision such that the longitudinal elements are provided with kinks bent alternately in opposite directions transversely to the surface of the net. This measure is particularly advantageous if the longitudinal elements form diamond-shaped loops the limbs of which have kinks bent in opposite directions.

With regard to the use of the protective net in environmentally adverse conditions, the invention also makes provision such that the longitudinal elements are produced from wires, cords or strands made of corrosion-resistant, rust-proof and corrosion protection-coated steel. Advantageously the wires, cords or strands are produced from high strength steel with a strength of 1000 N/mm$^2$ to 3200 N/mm$^2$.

For the purpose of flexible end connection of the longitudinal elements it is advantageous if the wires, cords or strands are knotted at the end to form loops by means of which they can be connected with one another in pairs to wire clips, wire hooks or similar connection elements.

BRIEF DESCRIPTION OF THE DRAWINGS

In the following the invention will be described in more detail by means of exemplary embodiments with reference to the drawings. These show as follows.

DETAILED DESCRIPTION OF THE INVENTION

Figure 1:
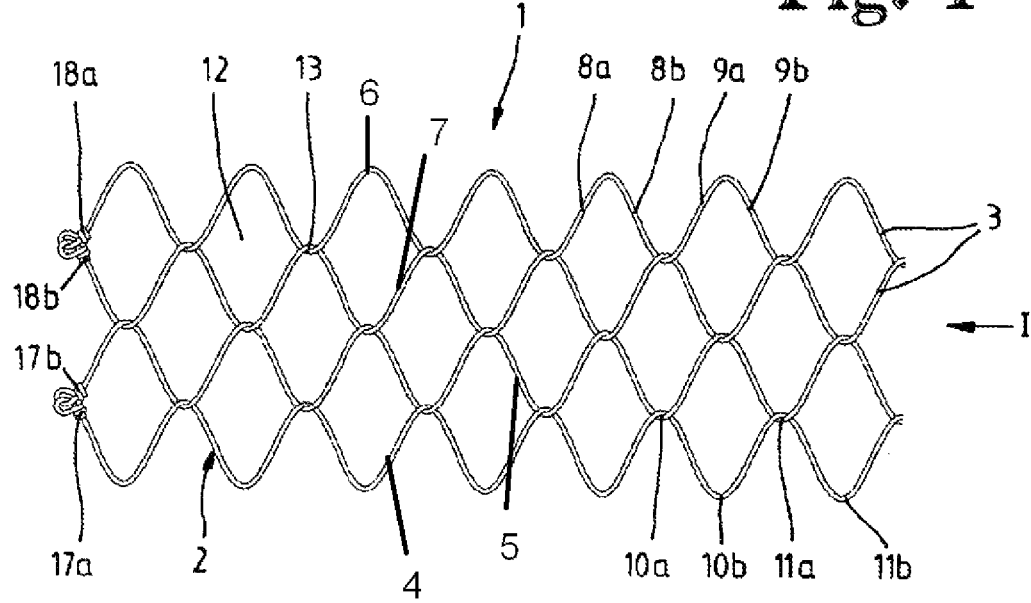
FIG. 1 is a net according to the invention, shown in simplified form in the front view.

FIG. 1 shows part of a net 1 which can be used in particular as a net that protects against rockfall, landslides, avalanches, unstable embankments and similar natural hazards. Moreover, it can be used for safety purposes or for aesthetic purposes in architecture. For example, they are used as fencing systems, shut-off and safety barriers, shatter protection, break-in and break-out protection, thoroughfare blocks for vehicles or ships and for further safety-relevant net solutions. This type of net is also suitable, however, as a protective net for baskets or covers for the rearing of fish, mussels or molluscs in bodies of water.

Figure 2:
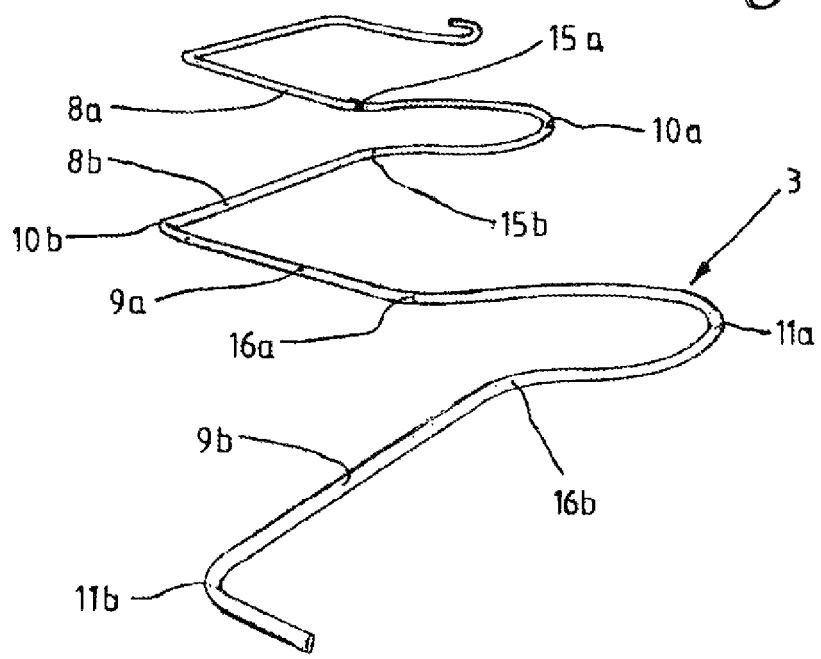
FIG. 2 is a perspectively illustrated longitudinal element of the protective net according to FIG. 1, FIG. 3 and FIG. 4 are respective embodiments of the longitudinal element from FIG. 2, shown in the direction of arrow 1 in FIG. 1.
Figure 5:
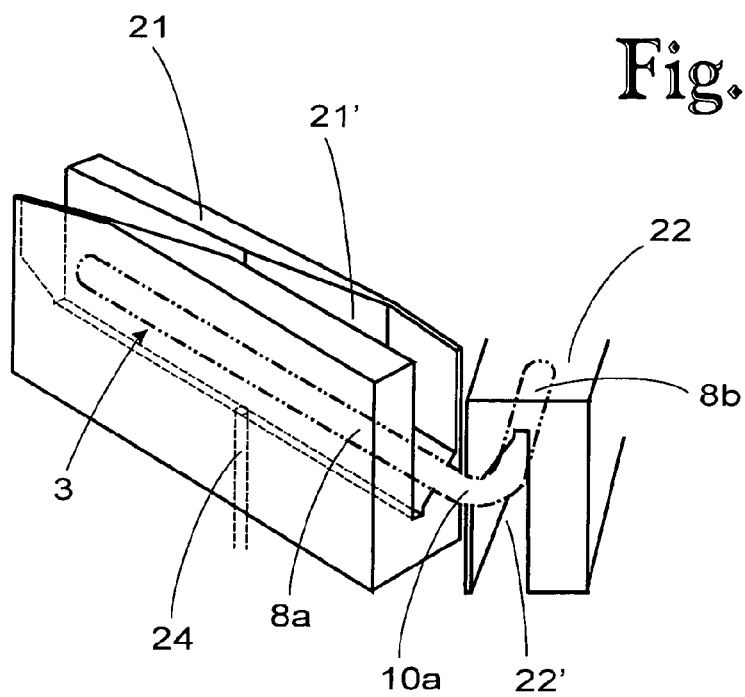
FIG. 5 is a perspective diagrammatic view of two stamps of an apparatus according to the invention for the production of the net.

The net 1 is made up of a wire mesh braided structure 2 that is produced from longitudinal elements 3 in the form of helically bent steel wires 4, 5, 6, 7 according to FIG. 5. The wires 4, 5, 6, 7 bent in the form of spirals are twisted one inside the other in pairs, are braided together and pressed flat here such that at the end of the shaping process they obtain the form shown in FIG. 2 with regularly successive limbs 8a, 8b; 9a, 9b and curves 10, 10b; 11a, 11b. Here the wound longitudinal elements 3 are compressed in the limb regions 8a, 8b; 9a, 9b such that they are more or less rectilinear.

Figure 3:
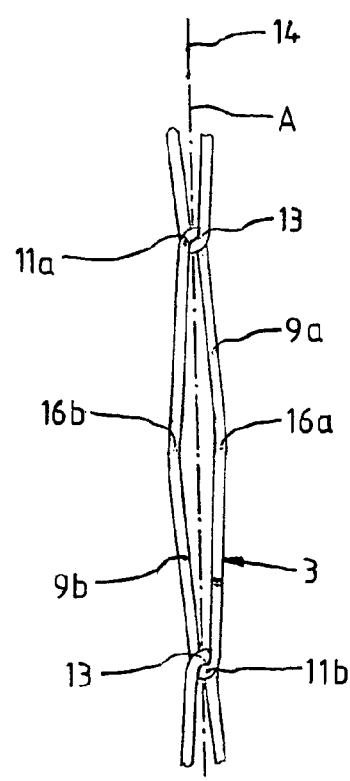
Figure 4:
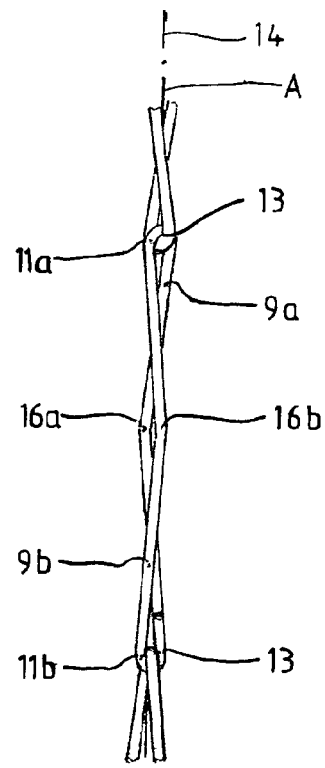

The wire mesh braided structure 2 produced in this way has diamond-shaped meshes 12 the flexible knots 13 of which define the net surface 14 drawn in by dots and dashes in FIG. 3 and FIG. 4 with an approximately planar sheet-like form A.

At their ends the wires of the longitudinal elements 3 are bent or knotted to form loops 17a, 17b; 18, 18b which make it possible to connect the wires at the end by means of wire clips or wire hooks guided in pairs through the loops 17a, 17b and 18a, 18b or by means of similar elements at the end. The knotted wire ends additionally enable inexpensive connection to the adjacent net sections of the protective net. Needless to say other comparable end connections for the wire ends of the longitudinal elements can also be used instead of knots.

According to the invention the wound longitudinal elements 3 are shaped into a more or less planar sheet-like form A in the net surface 14, the curves 10a, 10b; 11a, 11b respectively being produced in the form of kinks. These kink-like curves 10a, 10b; 11a, 11b are formed such that the radius of curvature is very small or almost zero on the inside of each respective curve 10a, 10b; 11a, 11b.

Moreover, within the framework of the invention the longitudinal elements 3 are formed such that they are more or less planar in the net surface 14 and are each provided with a slight kink 15a, 15b; 16a, 16b transversely to the net surface 14 in the limb region. The effect of this simple measure is that the net has higher tensile and tear strength values and clearly greater deformability than without the kinks. In this way, if there is an impact from a heavy object it can absorb more kinetic energy.

The kinks 15a, 15b; 16a, 16b are arranged approximately in the middle of the limbs 8a, 8b; 9a, 9b, alternately in opposite directions transverse to the net surface 14. They have a height of at most a few millimeters which is advantageously determined dependently upon the diameter of the longitudinal elements 3.

It is also possible within the framework of the invention to provide a number of kinks in each limb running in the same or in opposite directions. Even very slight kinks enable advantageous elastic or plastic springing functions depending on the application.

As can be seen from FIG. 3 and FIG. 4, it is also possible within the framework of the invention to vary the geometry of the wire braided structure 2 provided its longitudinal elements 3 are more or less planar in the net surface 14 and their limbs 8a, 8b; 9a, 9b are provided with slight kinks transversely to the net surface 14. Depending on the conditions of use, a braided structure made up of cords or strands can also be used instead of the wire braided structure.

The flexible connections 13 between the wires 3 make it possible to roll up or fold up the braided structure. This is advantageous for transportation and storage of the net.

FIG. 5 to FIG. 8 show diagrammatically two of the stamps 21, 22 of an apparatus according to the invention arranged in rows. These stamps 21, 22 are respectively provided with a guide groove 21', 22' receiving the wire 3 on the front face side and are arranged in relation to one another such that the guide grooves 21', 22' are alternately directed towards one another and run according to the gradient angle of the limbs 8a, 8b; 9a, 9b. These stamps 21, 22 can be adjusted here backwards and forwards transversely to the longitudinal extension of the helically bent longitudinal elements 3 a specific distance apart from one another by means of driveable rods.

Figure 6:
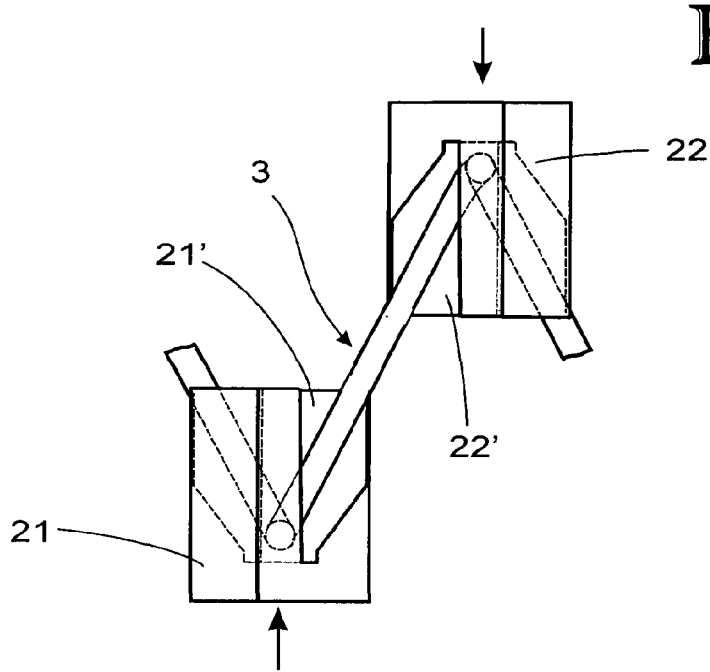
FIGS. 6, 7 and 8 each show two stamps respectively shown diagrammatically in a diagrammatic view and which are shown, collectively, in three different positions adjusted in relation to one another and which here are pressing flat a wire bent in helical form.

FIG. 6 illustrates the initial position of two of the stamps 21, 22 arranged in rows which are spaced apart depending upon the gradient height of the individual wire helix. Here, the helically bent wire 3 is turned along its longitudinal axis into the guide grooves 21', 22' similarly to screwing in and, moreover, is at the same time threaded into an adjacent wire that has already been pressed flat, but which is not detailed. In this way the net can be produced continuously.

Figure 7:
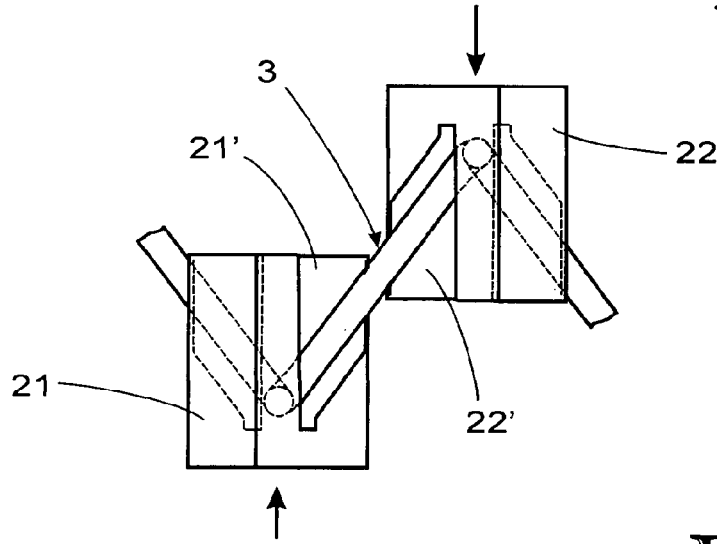

FIG. 7 shows the two stamps 21, 22 in a position displaced in relation to one another and compressing the wire 3.

Figure 8:
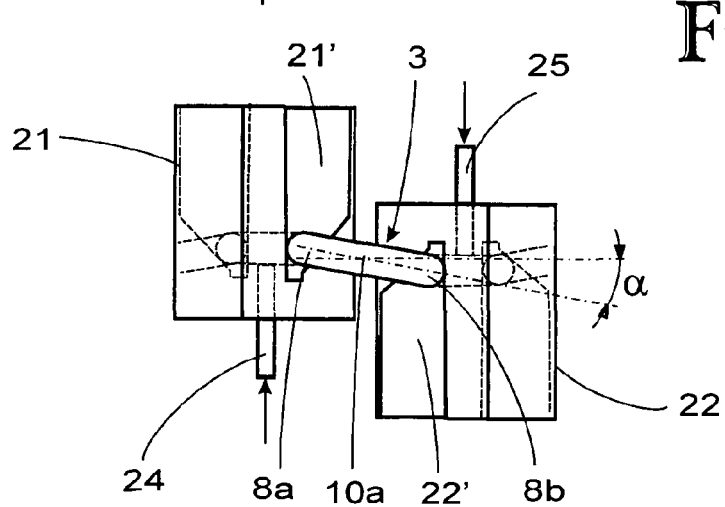

It emerges from the final position of the stamps 21, 22 according to FIG. 8 how the curves 10a, respectively made in a kink shape, of the longitudinal elements are produced between the elongate limbs 8a, 8b. The elongate limbs 8a, 8b produced upon achieving the planar sheet-like form are guided more or less over their entire length by the stamps 21, 22, as can also be gathered from FIG. 5. Here the longitudinal elements 3 respectively only project from the stamps 21, 22 at the curve 10a, 10b.

The respectively adjacent limbs 8a, 8b are compressed against one another transversely to their longitudinal extension until achieving the planar sheet-like form A plus an additional angle α. With this over-expansion of the limbs the respective kink shape of the curves is additionally favoured because in this way a type of strength increase is brought about to a certain extent, this angle α, which is preferably between 10° and 30°, becoming smaller when the stamps are drawn back and the longitudinal element is released by the springing back of the limbs.

In order to produce the kinks 15a, 15b; 16a, 16b in the longitudinal elements 3 the stamps 21, 22 are equipped with pins 24, 25 that can also be moved backwards and forwards transversely to the longitudinal extension of the longitudinal elements 3, and which are preferably moved perpendicularly towards the limbs 8a, 8b in this end position of the stamps 21, 22 shown in FIG. 8 to such an extent that these permanent kinks are produced.

For nets made of a wire braided structure high-strength wires with strengths of between 1000 N/mm$^2$ and 3200 N/mm$^2$ are preferably used which withstand particularly high loading.

Depending on the application and the desired deformation characteristics, however, applications in the nominal strength range of between 350 N/mm$^2$ and 1000 N/mm$^2$ are also advantageous.

In consideration of the conditions of use in the open air rust-proof, corrosion-resistant steels or steels coated with corrosion protection are preferred. When using these nets as baskets or covers in the rearing of fish or mussels they are provided with an anti-fouling layer which may contain, for example, copper. When using cords or strands it is not necessary for them to be made exclusively of high-strength wires with the nominal strength values specified above.

With the net according to the invention it is additionally made possible to produce round, cylindrically closed net elements which can, for example, be placed over mussel rearing elements. Cube-like bodies made up of individual net elements can also be produced.

The corresponding wire diameters for the net according to the invention are preferably in the range of between 0.5 mm and 5.0 mm. Instead of individual wires, strands (e.g. consisting of 2 to 7 wires) can also be used.

The invention is sufficiently demonstrated by the above exemplary embodiment. However, it could also be illustrated by other versions. Thus, for example, a number of or theoretically no kinks could be provided for each limb element depending on the application. Here, preferably an odd number of kinks is advantageous. Instead of the previously mentioned kink, similar shapings also advantageously lead to improvements according to the invention. Such shapings can, similarly to kinks, be made to be slightly elongated and/or oval in shape.

Depending on the intended use of the net, the individual longitudinal elements can in principle also be made with different strengths.

The invention claimed is:

1. A net, comprising:
    a plurality of individual, bent longitudinal elements coupled together to form a woven structure,
    each of the longitudinal elements being individually curved into a cylinder or screw shape to provide a first set of spaced apart curves on a first side of the longitudinal element and a second set of spaced apart curves on a second side of the longitudinal element, the curves in the first and second sets of curves alternating with one another in a longitudinal direction of the longitudinal element such that each curve of the first set is between two curves of the second set and each curve of the second set is between two curves of the first set,
    a first one of the longitudinal elements being twisted on one side with an adjacent second one of the longitudinal elements such that each of the curves of the first set of curves of the first longitudinal element passes around and inside of a respective one of the curves of the second set of curves of the second longitudinal element to form knots each between one of the curves of the first set of curves of the first longitudinal element and a respective one of the curves of the second set of curves of the second longitudinal element,
    the first longitudinal element being twisted on another side with an adjacent third one of the longitudinal elements such that each of the curves of the second set of curves of the first longitudinal element passes around and inside of a respective one of the curves of the first set of curves of the third longitudinal element to form knots each between one of the curves of the second set of curves of the first longitudinal element and the respective one of the curves of the first set of curves of the third longitudinal element, and
    the longitudinal elements being compressed such that the woven structure has a substantially planar form,
    each of the longitudinal elements including elongate limbs between adjacent curves such that each of the limbs is situated between one of the curves of the first set of curves and one of the curves of the second set of curves,
    the curves between the elongate limbs being kinks.

2. The net according to claim 1, wherein the elongate limbs extend outward from a plane passing through the knots to define an angle between the plane passing through the knots and a plane including both of the elongate limbs.

3. The net according to claim 1, wherein at least one of the longitudinal elements includes at least one limb kink in a region of a respective one of the limbs between adjacent ones of the curves.

4. The net according to claim 3, wherein the at least one limb kink in the region of the respective limb extends transversely to a plane passing through the knots such that the at least one limb kink is spaced apart from the plane passing through the knots.

5. The net according to claim 3, wherein the at least one limb kink in the region of the respective limb has a height from the plane passing through the knots which is dependent upon a diameter of the longitudinal elements.

6. The net according to claim 1, wherein the longitudinal elements have limb kinks bent alternately in opposite directions transversely relative to a plane passing through the knots such that one set of alternating limb kinks is bent in one direction away from the plane passing through the knots and another set of remaining limb kinks is bent in an opposite direction away from the plane passing through the knots.

7. The net according to claim 6, wherein the longitudinal elements form diamond-shaped meshes and the limb kinks are sequentially situated on the longitudinal elements in the longitudinal direction and configured such that adjacent ones of the limb kinks are bent in opposite directions such that each of the limb kinks in a first set of limb kinks in alternating limbs is bent in a direction toward a respective, adjacent limb and each of the limb kinks in a second set of limb kinks in remaining limbs is bent in an opposite direction toward a respective adjacent limb having one of the limb kinks of the first of limb kinks.

8. The net according to claim 1, wherein the longitudinal elements are produced from wires, cords or strands made of corrosion-resistant, rust-proof or corrosion protection-coated steel.

9. The net according to claim 1, wherein the wires, cords or strands are produced from high strength steel.

10. The net according to claim 1, wherein adjacent pairs of the longitudinal elements are knotted at longitudinal ends of the longitudinal elements in each adjacent pair to form loops, the loops enabling the longitudinal elements to be connected flexibly to one another in pairs at their ends with wire clips or wire hooks or similar connection elements.

11. An apparatus for producing the net according to claim 1, comprising:
    stamps arranged in rows and which are adjustable in relation to one another transversely to the longitudinal extension of the longitudinal elements, each of the stamps including a guide groove for centering the longitudinal element on a front face side, and which run according to a gradient angle of the limbs, the stamps having an initial position in which one of the bent longitudinal elements is turned or inserted in the guide grooves of the stamps, the stamps having a final position in which the longitudinal element is compressed, the respective kinked shape of the curves being produced by the elongate limbs being guided through the stamps over substantially their entire length and the longitudinal elements respectively only projecting out of the stamps at the curve.

12. The apparatus according to claim 11, wherein the limbs are compressed until the limbs partly extend outward from a plane passing through the knots to define an angle between the plane passing through the knots and a plane including both of the elongate limbs.

13. The net according to claim 3, wherein the at least one kink in the region of the respective limb comprises a single kink in one of the limbs which is situated in a middle region of the limb such that a portion of the limb is between the single kink and an adjacent curve of the first set of curves and another, different portion of the limb is between the single kink and an adjacent curve of the second set of curves.

14. The net according to claim 9, wherein high strength steel from which the wires, cords or strands are produced has a nominal strength of from 1000 N/mm$^2$ to 3200 N/mm$^2$.

15. The net according to claim 1, wherein the longitudinal elements are helically bent and the elongate limbs are substantially rectilinear.

16. A net, comprising:
a plurality of individual, bent longitudinal elements coupled together to form a woven structure,
each of the longitudinal elements having a first set of spaced apart curves on a first side and a second set of spaced apart curves on a second side, the curves in the first and second sets of curves alternating with one another in a longitudinal direction of the longitudinal element such that each curve of the first set is between two curves of the second set and each curve of the second set is between two curves of the first set,
each of the longitudinal elements being twisted inside a pair of adjacent longitudinal elements such that each of the curves of the first set of curves of the longitudinal element passes around a respective one of the curves of the second set of curves of one adjacent longitudinal element to form knots each between one of the curves of the first set of curves of first longitudinal element and a respective one of the curves of the second set of curves of the adjacent longitudinal element and such that each of the curves of the second set of curves of the longitudinal element passes around a respective one of the curves of the first set of curves of the other adjacent longitudinal element to form knots each between one of the curves of the second set of curves of the longitudinal element and the respective one of the curves of the first set of curves of the other adjacent longitudinal element, and
each of the longitudinal elements including elongate limbs between adjacent curves such that each of the limbs is situated between one of the curves of the first set of curves and one of the curves of the second set of curves,
the curves between the elongate limbs being kinks,
the elongate limbs being displaced from a plane passing through the knots to define an angle between the plane passing through the knots and a plane including both of the elongate limbs.

17. The net according to claim 16, wherein at least one of the longitudinal elements includes limb kink each in a region of a respective one of the limbs between a respective adjacent pair of the curves such that, for each limb, a portion of the limb is between the limb kink and an adjacent curve of the first set of curves and another, different portion of the limb is between the limb kink and an adjacent curve of the second set of curves.

18. The net according to claim 16, wherein the limb kinks in each of the longitudinal elements are bent alternately in opposite directions transversely relative to a plane passing through the knots such that one set of alternating limb kinks is bent in one direction away from the plane passing through the knots and another set of remaining limb kinks is bent in an opposite direction away from the plane passing through the knots.

19. A method for producing a net, comprising:
providing a plurality of individual, bent longitudinal elements, each of the longitudinal elements being individually curved into a cylinder or screw shape to provide a first set of spaced apart curves on a first side of the longitudinal element and a second set of spaced apart curves on a second side of the longitudinal element, the curves in the first and second sets of curves alternating with one another in a longitudinal direction of the longitudinal element such that each curve of the first set is between two curves of the second set and each curve of the second set is between two curves of the first set, each of the longitudinal elements including elongate limbs between adjacent curves such that each of the limbs is situated between one of the curves of the first set of curves and one of the curves of the second set of curves, the curves between the elongate limbs being kinks;
coupling the longitudinal elements together to form a woven structure by
twisting a first one of the longitudinal elements on one side with an adjacent second one of the longitudinal elements such that each of the curves of the first set of curves of the first longitudinal element passes around and inside of a respective one of the curves of the second set of curves of the second longitudinal element to form knots each between one of the curves of the first set of curves of the first longitudinal element and a respective one of the curves of the second set of curves of the second longitudinal element, and
twisting the first longitudinal element on another side with an adjacent third one of the longitudinal elements such that each of the curves of the second set of curves of the first longitudinal element passes around and inside of a respective one of the curves of the first set of curves of the third longitudinal element to form knots each between one of the curves of the second set of curves of the first longitudinal element and the respective one of the curves of the first set of curves of the third longitudinal element; and
compressing the longitudinal elements to provide the woven structure with a substantially planar form.

20. The method according to claim 19, further comprising compressing the limbs until the limbs partly extend outward from a plane passing through the knots to define an angle between the plane passing through the knots and a plane including both of the elongate limbs.

\* \* \* \* \*